United States Patent [19]

Culshaw

[11] Patent Number: 4,736,650

[45] Date of Patent: Apr. 12, 1988

[54] STEERING WHEEL CONSTRUCTION

[75] Inventor: George V. Culshaw, Adelaide, Australia

[73] Assignee: Bridgestone Australia, Ltd., Edwardstown, Australia

[21] Appl. No.: 926,694

[22] Filed: Nov. 3, 1986

[30] Foreign Application Priority Data

Nov. 5, 1985 [AU] Australia .................. PH3263

[51] Int. Cl.⁴ .................. B62D 1/04; G05G 1/10
[52] U.S. Cl. .................. 74/552; 29/159 B; 280/777
[58] Field of Search .................. 74/552–558; 29/159 B; 280/777, 778

[56] References Cited

U.S. PATENT DOCUMENTS

| 1,819,707 | 8/1931 | German | 74/552 |
| 3,196,708 | 7/1965 | Weitzman | 74/552 |
| 3,529,490 | 9/1970 | Pawsat et al. | 74/552 |
| 3,530,738 | 9/1970 | Kerr | 74/552 |
| 3,726,147 | 4/1973 | Spietz | 74/552 |
| 4,047,450 | 9/1977 | Lecart et al. | 74/552 |
| 4,448,091 | 5/1984 | Bauer et al. | 74/552 |
| 4,468,978 | 9/1984 | Takahara et al. | 74/552 |
| 4,681,647 | 7/1987 | Kondo et al. | 74/552 |

FOREIGN PATENT DOCUMENTS

| 0029616 | 6/1981 | European Pat. Off. | 74/552 |
| 1151080 | 1/1958 | France | 74/552 |
| 1216366 | 4/1960 | France | 74/552 |
| 1271764 | 8/1961 | France | 74/552 |
| 2432418 | 2/1980 | France | 74/552 |
| 1183048 | 3/1970 | United Kingdom | 74/552 |

Primary Examiner—Gary L. Smith
Assistant Examiner—Vinh Luong
Attorney, Agent, or Firm—Townsend & Townsend

[57] ABSTRACT

The metal structure of an automotive type steering wheel having a metal hub, rim and spokes. The rim and spokes are formed by bending a single length of metal so that the spokes occupy a 'V' formation, the apex of which is welded to the hub. The ends of the metal length are welded back to intermediate portions thereof.

5 Claims, 2 Drawing Sheets

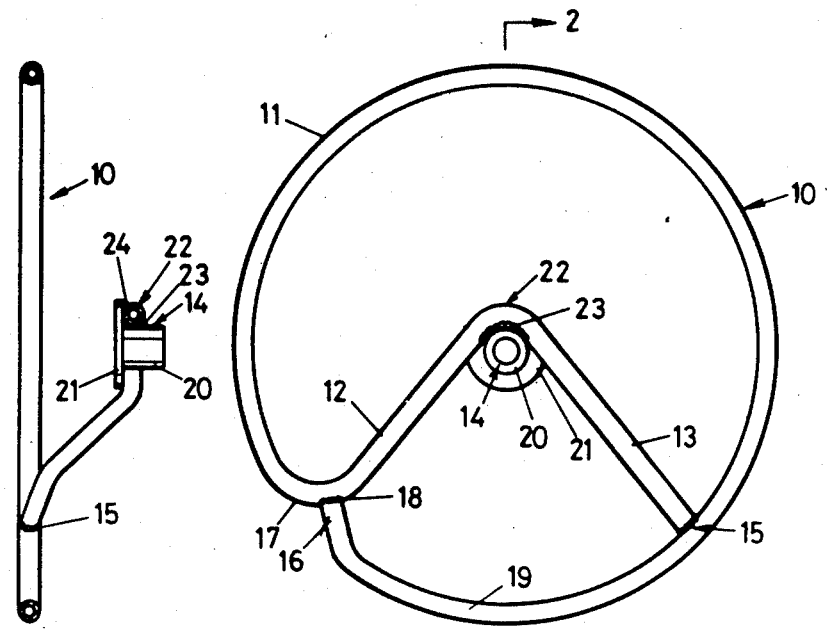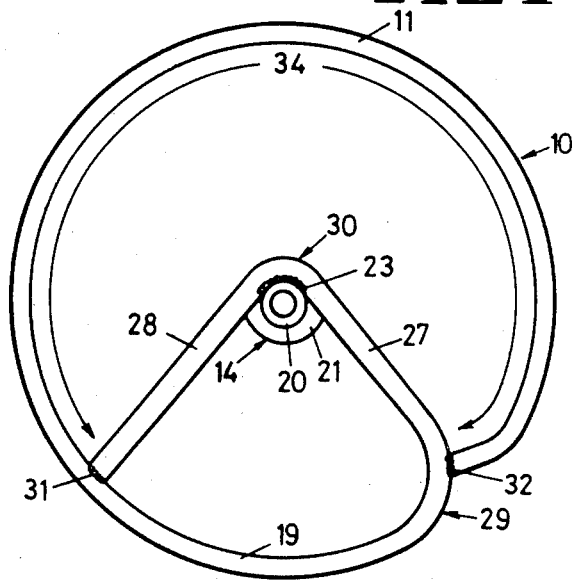

4,736,650

STEERING WHEEL CONSTRUCTION

This invention relates to improvements in steering wheel construction of the type having a metal structure including a metal hub, rim and spokes, some at least of which is contained within a moulding of resilient polymeric material.

BACKGROUND OF THE INVENTION

Heretofore it has been common to form separate assemblies of rim and spokes for automotive steering wheels of the type referred to, and for example reference may be made to the Australien Pat. Nos. 535883 (60416/80), 534549 (66660/81) Ford, or the General Motors' U.S. Pat. No. 523159 (52771/79), these being the closest prior art known to the Applicant. However each of those specifications refers to an assembly, but it is common engineering practice to effect assembly of metal parts solely by welding, for example for joining a circular rim of tubing to a central hub by a pair of spokes welded therebetween. It is also common practice to envelop an entire metal assembly, or all except the hub, within a moulding of resilient polymeric material. Foam polyurethane with a dense skin is frequently used for this purpose.

The most highly stressed part of a steering wheel is where the spokes are joined to the hub. If the hub includes a flat plate, and if both hub and plate have ample thickness, good welding conditions exist and little difficulty is likely to be encountered. However if the hub has a circular base with an outstanding flange (a very commonly used shape), the welding conditions are not good and difficulties can be experienced in achieving the required strength. One object therefore is to provide improved welding conditions, and this is achieved by spokes of general 'V' formation, the hub being welded to the apex of the 'V'. This provides an improved welding condition, and the quantity of metal can therefore be reduced below what is required in prior art, without serious danger of loss of strength. The spokes can, for example, be tubular.

The other localities of weakness in the metal structure of steering wheels is where the spokes join the rim. Again there is a requirement for good welding conditions. Another object of the invention is to improve the spoke/rim arrangement, and this is achieved by the spokes and rim being a unitary member having ends joined by welds to respective intermediate portions of the member. By this arrangement, only one of the spokes is joined by a weld to the rim, and even if there is a weld failure, it is limited to one spoke only. This improvement, combined with the improved join between the spokes and hub, provides a metal structure with much less risk of failure than any previous steering wheel structure known to the Applicant, even if the weight of metal is less than in the prior art wheel.

BRIEF SUMMARY OF THE INVENTION

In this invention, the metal structure of an automotive type steering wheel has a metal hub, rim and spokes. The rim and spokes are formed by bending a single lengths of metal so that the spokes occupy a 'V' formation, the apex of which is welded to the hub. The ends of the metal length are welded back to intermediate portions thereof.

More specifically, the invention consists of a metal hub, rim and spokes, said rim and spokes being a unitary member having ends joined by welds to respective intermediate portions of the member, there being two spokes of general 'V' formation, and at least one weld joining the apex of that 'V' formation to the hub.

BRIEF DESCRIPTION OF THE DRAWINGS

Embodiments of the invention are described hereunder in some detail with reference to, and are illustrated in, the accompanying drawings, in which:

FIG. 1 is a top view of a steering wheel metal structure,

FIG. 2 is a section taken on line 2—2 of FIG. 1,

FIG. 3 shows a second embodiment wherein an end of the rim and the two spokes define a small "loop" (or "eye") within which the hub is welded.

DETAILED DESCRIPTION OF THE PREFERRED EMBODIMENTS

Figure 4:
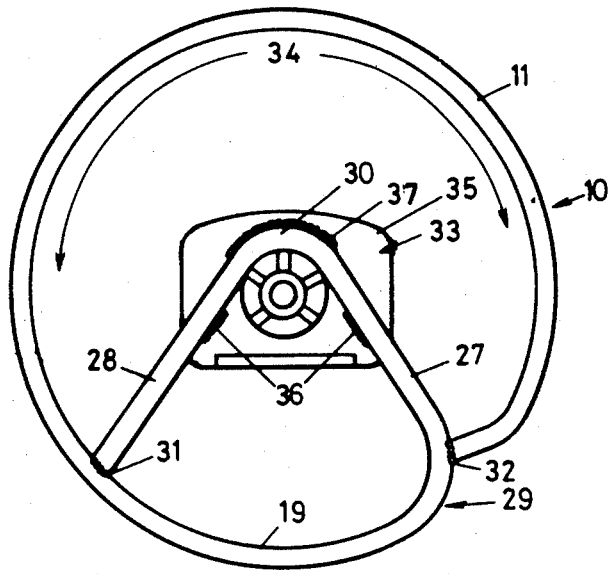
FIG. 4 shows a third embodiment wherein the hub comprises a flat plate to which the spokes are welded.

In the first embodiment of FIGS. 1 and 2, a metal structure 10 of a steering wheel comprises a single length of tubing formed into a generally circular rim 11 and two spokes 12 and 13. Spoke 12 is formed by bending the tube at 17 radially inwardly from the rim 11, again bending it to pass over and partly surround the hub 14 and welding the other end of the spoke 13 so formed to another portion of the rim at 15. The free end 16 of the rim is welded at 18 to spoke 12 adjacent the bend 17, which is a mechanically strong location for that weld. The welds 15 and 18 are thereby spaced by a minor portion 19 of the rim.

Hub 14 comprises a cylindrical portion 20 with a flange 21 at one end, and the apex 22 of the 'V' formation of the spokes 12 and 13 abuts both the portions 20 and 21 and is secured thereto by two welds 23 and 24 which are effected under excellent conditons such that danger of failure is minimal.

The structure 10 according to the second embodiment of FIG. 3 is similar to the first, but whereas in the first embodiment, the first spoke 12 was formed to pass over the hub 14 and the second spoke 13 to be welded to the rim at 15 near one end thereof, in the second embodiment the first and second spokes 27 and 28 have return bends 29 and 30 which define a "loop" or "eye" with minor portion 19 of rim 11, the second spoke 28 being welded at 31 to the rim 11 at a point near the bend, not a point near the free end of the rim (before welding). The end of the rim is welded at 32 to bend 29, so that the welds 31 and 32 are spaced by a major portion 34 of rim 11. FIG. 3 is thereby slightly stronger than FIG. 2 although strength is adequate in each case. Other elements are similar and bear similar designations.

In the third embodiment of FIG. 4, the shape of the rim and spokes is similar to FIG. 3, but the hub 33 comprises a flat mounting plate 35 to which the apex of the 'V' formation of spokes 27 and 28 is welded at 36 and 37, also under excellent welding conditions.

In the very unlikely event of welds between the spokes and rim fracturing, the hazard is nevertheless minimal, since spokes 27 and 28 lie wholly within the rim 11, and where the end of the tubing of rim 11 abuts spoke 12 (FIG. 1) or 27 (FIGS. 3 and 4), it is not directed toward a driver. Since there is a continuous length of tubing, the danger of fracture of welds is substantially reduced, for example in the case of an accident, and there is a consequential reduction in the safety hazard otherwise encountered.

The claims defining the invention are as follows:

1. Improvements in the construction of a steering wheel having a metal structure which, in use, will be at least partly contained within a moulding of resilient polymeric material,
said metal structure comprising a metal hub, a rim and 1st and 2nd spokes, said rim and spokes being formed from a single piece having ends joined by welds to respective intermediate portions of the single piece, said spokes arranged in a general 'V' formation and partly surrounding the hub at an apex of the 'V', and at least one weld joining the single piece at its said apex to the hub.

2. Improvements according to claim 1 wherein said single piece is a single length of tubing, there being a bend between the rim and one of the spokes, a further weld joining one end of said tubing length to said rim at the locality of the bend, the other said spoke terminating in the other end of said tubing length, and a further weld joining that said other spoke end to an inner surface of the rim.

3. Improvements according to claim 2 wherein said further welds are spaced from each other by a minor portion of the rim.

4. Improvements according to claim 2 wherein the bends which form said spokes are two return bends which define a "loop" with a minor portion of the rim, such that the further welds are spaced from each other by a major portion of the rim.

5. Improvements according to claim 1 wherein said hub comprises a cylindrical portion and a flange at one end thereof, there being two hub welds between the spokes at the apex of the 'V' formation thereof and the hub, one to the cylindrical portion and the other to the flange.

* * * * *